(12) United States Patent
Lee et al.

(10) Patent No.: US 9,939,648 B2
(45) Date of Patent: Apr. 10, 2018

(54) HEAD MOUNTED DISPLAY DEVICE WITH DUAL CURVED DISPLAYS

(71) Applicant: Google Inc., Mountain View, CA (US)

(72) Inventors: Johnny Chung Lee, Mountain View, CA (US); Ashish Ashok Shah, San Jose, CA (US); Renzo De Nardi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/189,607

(22) Filed: Jun. 22, 2016

(65) Prior Publication Data

US 2016/0377869 A1    Dec. 29, 2016

Related U.S. Application Data

(60) Provisional application No. 62/183,289, filed on Jun. 23, 2015.

(51) Int. Cl.
*G02B 27/14* (2006.01)
*G09G 5/00* (2006.01)
*G02B 27/01* (2006.01)

(52) U.S. Cl.
CPC .... *G02B 27/0172* (2013.01); *G02B 2027/013* (2013.01); *G02B 2027/0118* (2013.01); *G02B 2027/0134* (2013.01); *G02B 2027/0178* (2013.01)

(58) Field of Classification Search
CPC .......... G02B 2027/0178; G02B 27/017; G02B 27/0172; G02B 27/0176; G02B 2027/0174; G02B 2027/0112; G02B 2027/0123; G02B 2027/013; G02B 2027/0134; G02B 2027/0161; G02B 2027/0163; G02B 2027/0192; G02B 2027/0196; G02B 27/01; G02B 27/0101
USPC ......................................... 359/630; 345/7–9
See application file for complete search history.

(56) References Cited

U.S. PATENT DOCUMENTS

| 5,483,307 A | 1/1996 | Anderson |
| 7,667,783 B2 | 2/2010 | Hong et al. |
| 8,483,307 B2 | 7/2013 | Choi et al. |
| 8,582,209 B1 | 11/2013 | Amirparviz |
| 2004/0227703 A1 | 11/2004 | Lamvik et al. |
| 2014/0266990 A1 | 9/2014 | Makino |
| 2014/0300532 A1* | 10/2014 | Karkkainen ............ G06F 3/015 345/156 |

OTHER PUBLICATIONS

International Search Report and Written Opinion correlating to PCT/US2016/038736 dated Dec. 29, 2016, 11 pages.
Partial International Search Report and Written Opinion correlating to PCT/US2016/038736 dated Oct. 10, 2016, 6 pages.
International Preliminary Report on Patentability dated Jan. 4, 2018 for PCT Application No. PCT/US2016/038736, 8 pages.

* cited by examiner

*Primary Examiner* — William Choi

(57) ABSTRACT

A head mounted display (HMD) device includes first and second laterally-curved displays disposed about a medial plane, wherein each of the first and second curved displays includes a first lateral section distal from the medial plane and having a curvature with a first radius and a second lateral section adjacent to the medial plane and having a curvature with a second radius less than the first radius.

17 Claims, 3 Drawing Sheets

HEAD MOUNTED DISPLAY DEVICE WITH DUAL CURVED DISPLAYS

BACKGROUND

Field of the Disclosure

The present disclosure relates generally to display devices and, more particularly, to head mounted display devices.

Description of the Related Art

Immersive virtual reality (VR) and augmented reality (AR) systems typically utilize a head mounted display (HMD) device that presents stereoscopic imagery to the user so as to give a sense of presence in a three-dimensional (3D) scene. Conventional HMD devices implement either a single flat display that is separated two independent display regions, one for the left eye and one for the right eye of the user, or a pair of independent flat displays, one for each eye of the user. The conventional HMD further includes a circular lens for each eye so as to focus the entire image of the display into the user's eye. However, the use of flat displays and the circular lenses often results in a bulky HMD form factor, which in turn imparts a high moment of inertia when in use. Moreover, the flat displays and circular lenses constrain the lateral field of view, often to 110 degrees or less. The bulky size and limited field of view of these conventional HMDs can deleteriously impact the user's sense of presence in the displayed image and thus inhibit the feeling of being immersed in the presented scene.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
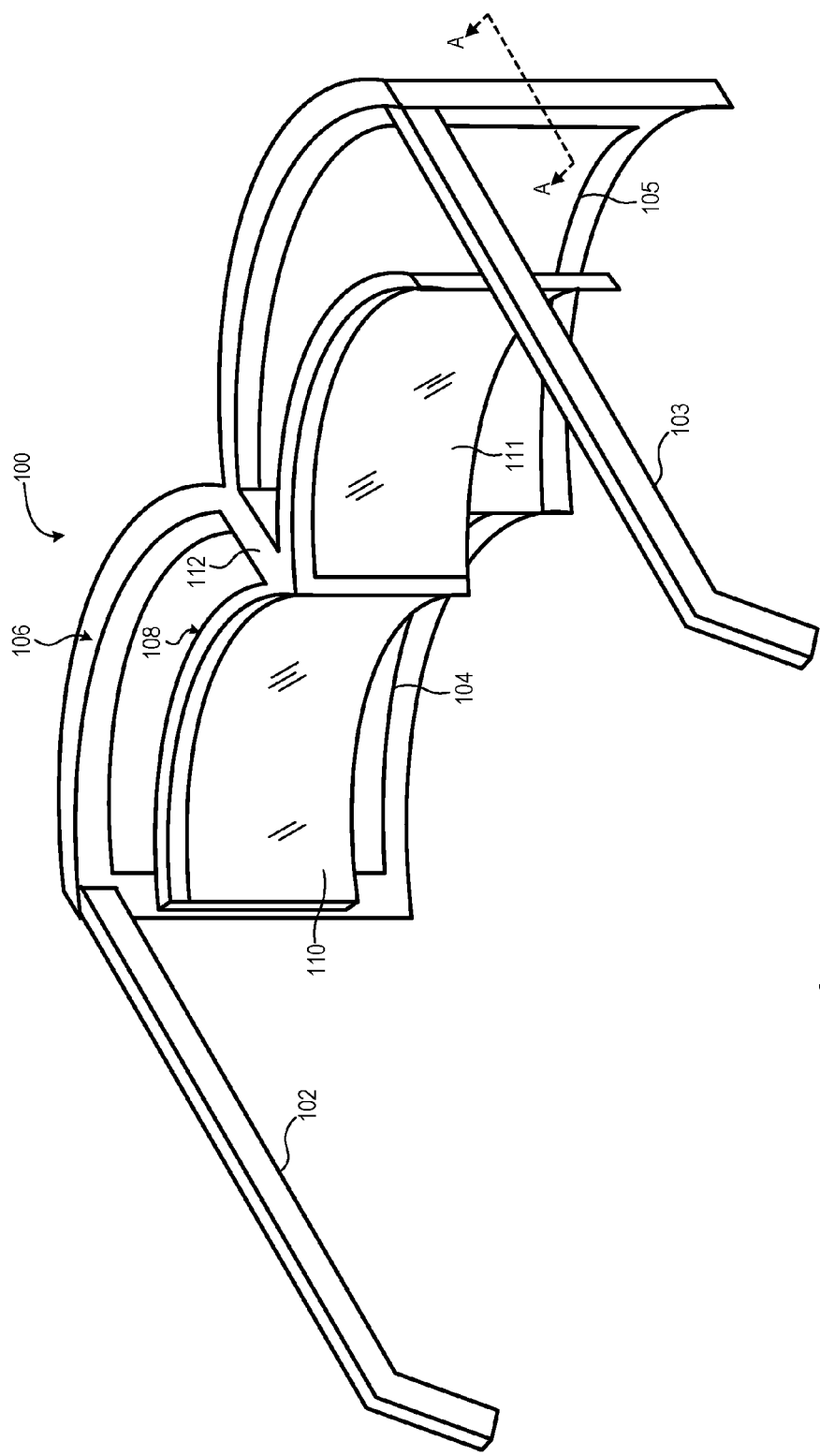
FIG. 1 is diagram illustrating a rear perspective view of a head mounted display (HMD) device utilizing dual curved displays in accordance with some embodiments.
Figure 2:
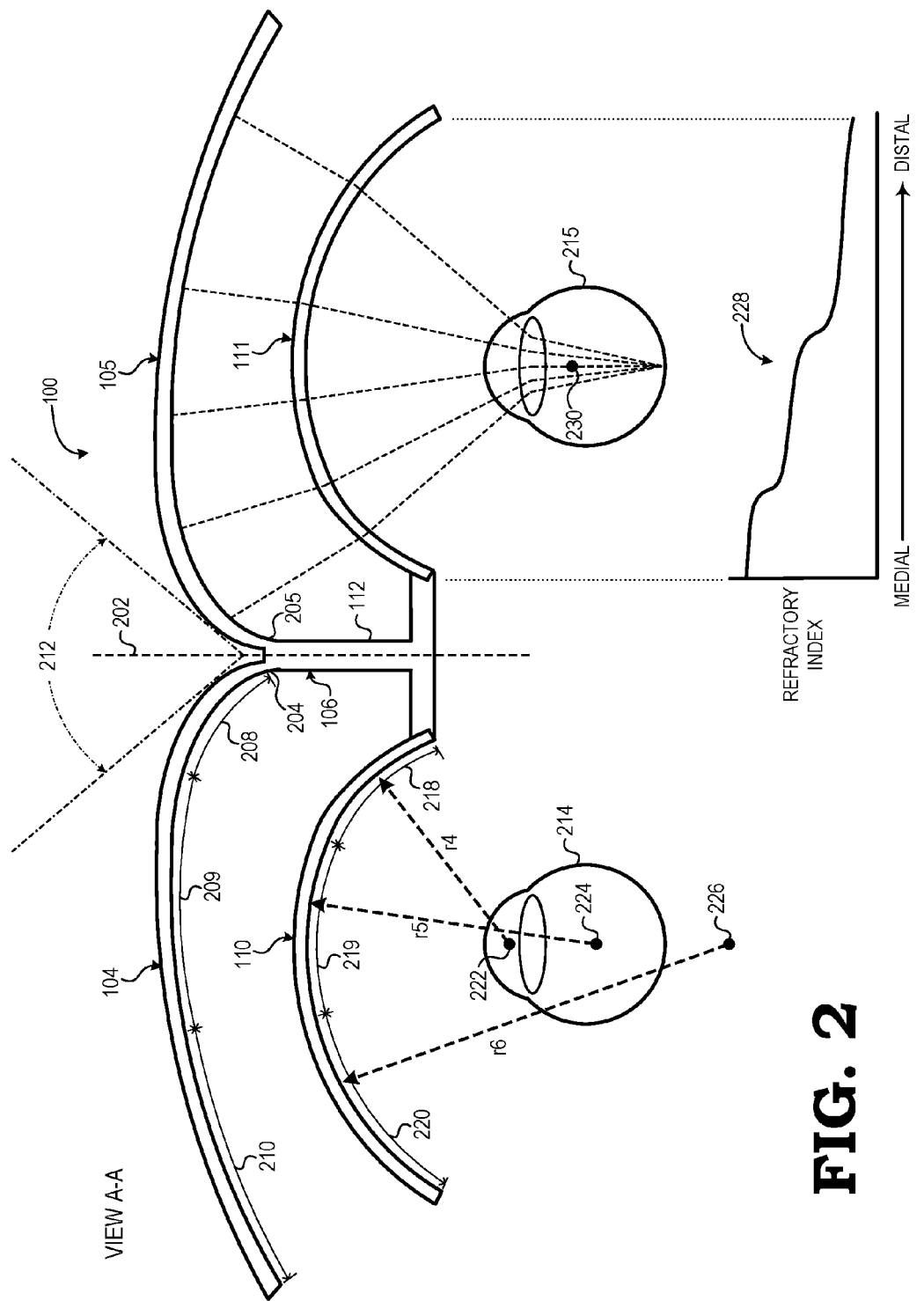
FIG. 2 is diagram illustrating a cross-section view of the HMD device of FIG. 1 in accordance with some embodiments.
Figure 3:
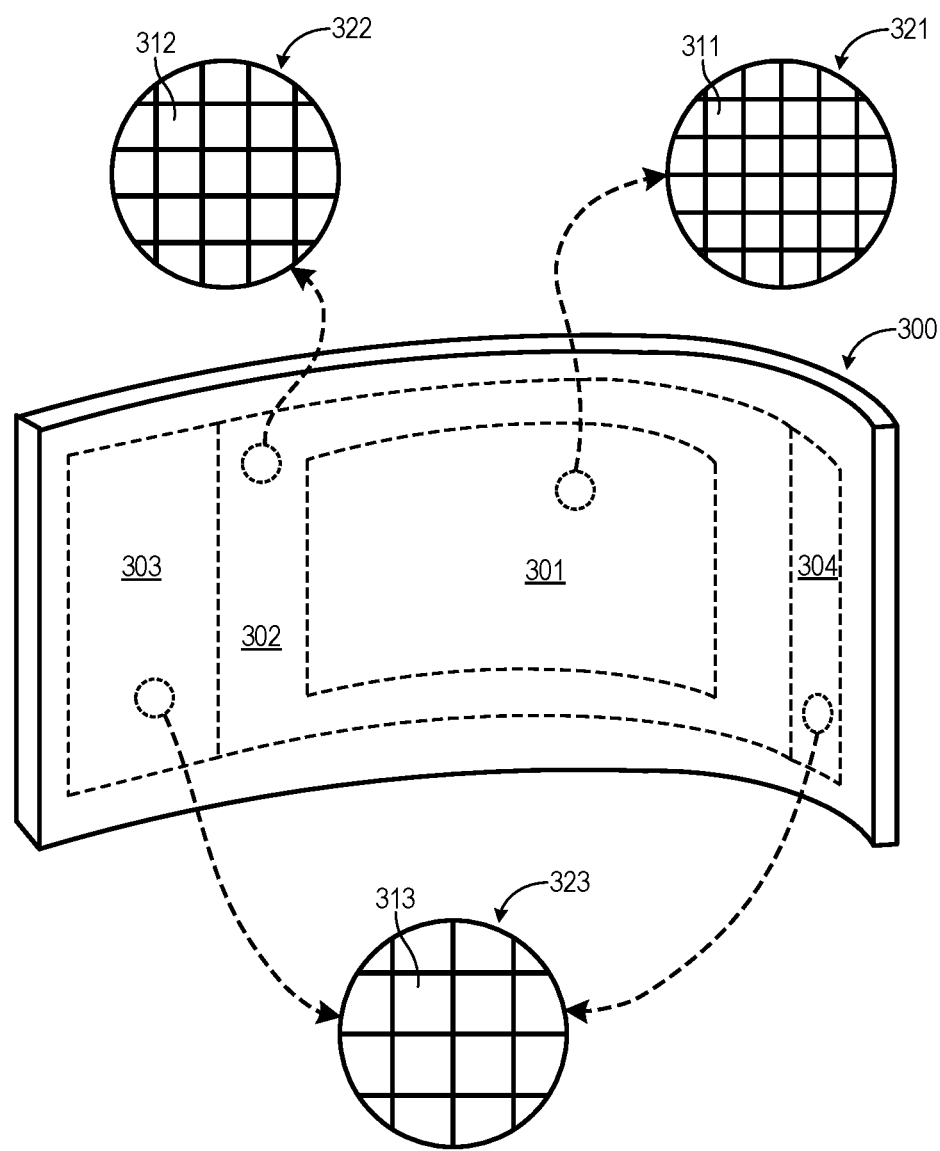
FIG. 3 is a diagram illustrating a foveated display of the HMD device of FIG. 1 in accordance with some embodiments.

FIGS. 1-3 illustrate examples of a HMD device that utilizes curved displays and curved optical lenses to enable a smaller form factor and wider lateral field of view compared to conventional HMDs utilizing flat displays. In at least one embodiment, the HMD device comprises a pair of laterally-curved displays, one for each of the user's eyes. Each display may be independently driven by a separate display controller, and the displays together may be operated to present a stereoscopic, or 3D, view of an AR or VR scene. The HMD further includes a pair of laterally-curved lenses, each being offset from the face of a corresponding one of the pair of laterally curved delays so as to focus the displayed image onto the corresponding eye. The combination of the laterally-curved displays and the laterally-curved lenses permits the implementation of an HMD with a form factor that more closely conforms to the user's head, and thus has a lower moment of inertia, while also providing a wider lateral field of view, such as up to 180-210 degrees.

In some embodiments, each display of the pair of displays may have a non-constant lateral curvature such that the medial section of the display (that is, the section closest to the user's nose) has a more pronounced curvature (that is, a smaller radius) than the more distal sections of the display. This permits each display to have an increased field of view in the medial direction, as well as providing enhanced stereoscopic resolution in the medial field of view between the user's eyes. Moreover, a design target may be to employ the lenses so that they have a constant curvature that is concentric with the user's eyes. However, this may not be achievable due to the structural limitations of the lens technology contemplated for use or due to space/dimensional constraints in the HMD device. In either instance, the non-constant lateral curvature of the lenses results in a scenario where different segments of the lens would have different focal lengths, and thus the display would be distorted when viewed through such lenses. Accordingly, to compensate for the varying intrinsic focal distances of the lenses due to their varying lateral curvature, in at least one embodiment the HMD utilizes laterally-curved lenses with a laterally-varying refractive index so as to adapt the focal power of the lens to the corresponding changes in lateral curvature of the lens.

FIG. 1 illustrates a rear perspective view of an implementation of a curved-display HMD device 100 in accordance with at least one embodiment of the present disclosure. In the depicted example, the HMD device 100 has an "eyeglass" form factor in which the HMD device 100 is mounted to a user's face via temples 102, 103, which are positioned behind the user's ears when worn by the user. However, in other embodiments the HMD device 100 may be implemented with a "mask" form factor in which the HMD device 100 is mounted to the user's face via one or more straps or other attachment devices. Further, although omitted for ease of illustration, the HMD device 100 also may include one or more face gaskets to seal against the user's face for the purposes of limiting ambient light intrusion.

The HMD device 100 includes a pair of curved displays 104, 105 mounted in a frame 106. The HMD device 100 further includes a lens subframe 108 mounted at a medial region of the frame 106 (e.g., the bridge of the frame 106), upon which a pair of curved lenses 110, 111 are mounted. The lens subframe 108 includes a bridge structure 112 that includes a standoff structure that extends from a posterior surface of the frame 106, and thus offsetting the lens 110 from the face of the display 104 and offsetting the lens 111 from the face of the display 105. For example, the standoff structure may implement a vertical structure extending from the bridge of the frame 106 (as shown in FIG. 1), a horizontal structure extending from the horizontal top bar of the frame, and the like.

As shown in FIG. 1, each of the curved displays 104, 105 has a lateral curvature oriented around an anticipated position of a corresponding eye of the user. This lateral curvature may be a constant curvature (that has a constant radius in the lateral direction) that is intended to be concentric about the corresponding eye, or the lateral curvature may vary across the lateral extent of the display (that is, has a varying radius in the lateral direction). For example, as described in more detail below with reference to FIG. 2, the curvature of each of the displays 104, 105 may be more pronounced in the region proximate to the bridge or medial of the frame 106. The curved displays 104, 105 may be implemented using any of a variety of display technologies capable of providing a curved display configuration, such as a thin-film flexible organic light emitting diode (OLED)-based display that is flexed into the desired curvature and maintained in this curvature via a supporting frame.

Each of the lenses 110, 111 is implemented as a convex optic that, like the displays 104, 105, has a lateral curvature oriented around an anticipated position of a corresponding eye of the user, and the lateral curvature may be constant or may vary across the lateral extent of the lens. As illustrated in FIG. 1, the lenses 110, 111 may be implemented as laterally-curved rectangular lenses. However, in other embodiments the lenses 110, 111, may be implemented as laterally-curved circular or oval lenses, irregularly shaped lenses, and the like. The cross-section profiles of the lenses 110, 111 may comprise any of a variety of convex (or positive) lens profiles, such as bi-convex, plano-convex, positive-meniscus, and the like. Further, in some embodiments, the lenses 110, 111 may be implemented as Fresnel lenses. The lenses 110, 111 may be composed of any of a variety of materials or combinations of materials suitable for fabricating laterally-curved lenses, such as plastic, glass, crystal, and the like.

Although not shown in FIG. 1 for purposes of clarity, the HMD device 100 also may include a variety of imaging and non-imaging sensors to support the VR or AR functionality of the HMD device 100. For example, the HMD device 100 may include an inertial management unit (IMU) having one or more of a gyroscope, magnetometer, and accelerometer to support pose detection of the HMD device 100, one or more imaging sensors to capture imagery in support of AR functionality or in support of visual telemetry functionality, an infrared depth sensor to support visual telemetry functionality, and the like. Further, the HMD device 100 may include one or more wired or wireless interfaces (not shown) to permit the HMD device 100 to be connected to an external computing system via a wired or wireless link for the purposes of transmitting and receiving information, such as transmitting pose information to a computing system and receiving stereoscopic VR imagery for display based on the pose information. Examples of these sensor configurations for an HMD are described in greater detail in U.S. Patent Application Ser. No. 62/156,815 (filed May 4, 2015), the entirety of which is incorporated by reference herein.

FIG. 2 illustrates a cross-section view of the HMD device 100 along cut line A-A of FIG. 1 in accordance with at least one embodiment of the present disclosure. As shown, the HMD device 100 is substantially symmetric about a medial plane 202 that corresponds to the midsaggital plane of the user when wearing the HMD device 100. The displays 104, 105 are connected to the frame 106 via the bridge structure 112 such that a right-side edge 204 of the display 104 is proximate to the left side of the medial plane 202 and a left-side edge 206 of the display 105 is proximate to the right side of the medial plane 202.

In some embodiments both of the displays 104, 105 have a lateral curvature that is more pronounced as the display approaches the medial plane 202, as is shown in FIG. 2. The displays 104, 105 each may be formed with a lateral curvature composed of multiple lateral sections with different radii. For example, the display 104 may have a medial lateral section 208 having a radius r1, an intermediate lateral section 209 having a radius r2, and a distal lateral section 210 having a radius r3, where r3>r2>r1, and display 105 may have a corresponding mirror configuration. In this configuration, the additional sweep of the displays 104, 105 in the medial region provides an improved lateral field of view in the medial direction, and in particular this pronounced inward curvature can provide enhanced stereoscopic or 3D vision in the region 212 in which the fields of view of the left and right sides of the HMD device 100 overlap.

The bridge structure 112 offsets the lenses 110, 111 from the faces of the displays 104, 105, and the lens subframe 108 is configured so as to orient the lenses 110, 111 with the anticipated position of the user's left eye 214 and right eye 215, respectively. In operation, the lens 110 focuses the entirety of the display face of the display 104 into the left eye 214 and the lens 111 focuses the entirety of the display face of the display 104 into the right eye 215. To accommodate for different user physiologies, the frame 106 may implement various mechanisms (not shown) to adjust the inter-pupillary distance (IPD) or for diopter adjustment.

In some embodiments, the lenses 110, 111 have a constant lateral curvature that is concentric with the corresponding eye. However, in many implementations a constant lateral curvature may be impracticable for the lenses 110, 111, such as due to constraints on the dimensions of the lenses 110, 111, constraints in the possible constant radius that the lens material may be placed in, and the like. Accordingly, in some embodiments the lenses 110, 111 may have a non-constant lateral curvature. To illustrate, as shown in FIG. 2, the lenses 110, 111 may have a lateral curvature that increases as the lens approaches the medial plane 202. For example, the lens 110 may have three lateral sections 218, 219, and 220, with medial lateral section 218 having a radius r4, intermediate lateral section 219 having a radius r5, and distal lateral section 220 having a radius r6, with r6>r5>r4, and the lens 111 may have a corresponding mirrored configuration. In such instances, the different lateral sections would exhibit different focal lengths without any compensating factors. To illustrate, assuming a constant material or constant density for the lens 110 across its lateral sweep, the lateral section 218, 219, and 220 would have different focal points 222, 223, and 224, respectively, and thus inhibit proper focusing of the imagery displayed by the display 104 for the left eye 214.

Accordingly, to compensate for the non-constant lateral curvature of the lenses 110, 111 in such instances, in at least one embodiment the lenses 110, 111 may be configured to have a laterally-varying refractive index to compensate for the laterally-varying curvature of the lens. To illustrate, assuming that lens 111 has a mirror-image version of the non-constant lateral curvature of the lens 110 described above, the lens 111 may be configured to have a varying refractive index as represented by chart 228 such that each lateral segment of the lens 111 is focused on the same point 230, thereby ensuring that the lens 111 correctly focuses the displayed imagery of the display 105 into the right eye 215 with minimal or no distortion. Note that the refractive index profile presented by chart 228 is exemplary only for purposes of illustrating variation in the refractory index of the lens 111 and does not necessarily reflect the actual refractive index profile necessary to provide a uniform focal length for a lens having the lateral curvature depicted in FIG. 2.

The lenses 110, 111 may have laterally-varying refractive indexes that are implemented in a continuous form, a discrete (or step-wise) form, or a combination thereof. To illustrate, the lenses 110, 111 may be implemented as curved plane gradient index (GRIN) lenses. Any of a variety of techniques may be utilized to configure different regions of the lenses 110, 111 with different refractive indexes. Typically, such techniques adjust the refractive index of the treated portion of the lens by changing the density of the lens portion. To illustrate, the lenses 110, 111 may be implemented using a boron-doped glass substrate, which is then bombarded with neutrons to induce a change in the boron concentration, with different lateral segments of the glass substrate receiving different concentrations of neutron bombardment. As another example, chemical vapor deposition (CVD) or another process may be used to form a lens with multiple layers of glass or other material with different refractive indexes, and the thickness or ratio of these layers may be varied between the lateral segments so as to implement a different overall refractive index for each lateral segment.

FIG. 3 illustrates an example implementation of a foveated display for the displays 104, 105 in accordance with at least one embodiment. As noted above, the displays 104, 105 of the HMD device 100 are used to provide a stereoscopic view of a projected scene so as to give the user a sense of presence in the scene. One factor for ensuring a sufficient sense of presence is to provide a sufficient display resolution and frame rate so that the displayed imagery more readily mimics a real-life scene. However, considering that two displays are being independently driven, the HMD device 100 otherwise may be bandwidth limited at high resolutions/high frame rates.

The human eye has a foveated characteristic in which the central region of the retina, or the fovea centralis, is capable of interpreting imagery at a much higher resolution than the surrounding regions of the retina. Accordingly, the HMD device 100 can take advantage of this foveated characteristic by implementing a foveated display 300 for each of the displays 104, 105. The foveated display 300 leverages the eye's foveated characteristic by employing a higher pixel density in the portion of the display that is in the center of view of the eye, and a lower pixel density in the peripheral view regions. To illustrate, in FIG. 3 the foveated display 300 may be implemented as a laterally-curved display segmented into four regions 301, 302, 303, and 304. Central region 301, being in the center of the field of view of the user's eye, is implemented with a high pixel density, as illustrated by the smaller, more densely packed pixels 311 in expanded view 321. Adjacent region 302, being adjacent to the center of view, is implemented with an intermediate pixel density, as illustrated by the larger, less densely packed pixels 312 in expanded view 322. Peripheral regions 303, 304, being in the periphery of the field of view, are implemented with a low pixel density, as illustrated by the large pixels 313 in the expanded view 323. In other embodiments, rather than vary radially from the user's center view, the pixel density may vary laterally from medial to distal edges of the display, or vary laterally from the center view to peripheral sections, and the like.

By using a foveated display 300, the same effective resolution may be presented to the user as would be a display having a uniform resolution, but with fewer pixels overall, the data bandwidth required to drive the foveated display 300 may be reduced compared to a display having a uniform resolution, and thus allowing the foveated display 300 to be driven at a higher frame rate or using a display pathway with a reduced throughput.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display (HMD) device comprising:
first and second laterally-curved displays disposed about a medial plane, wherein each of the first and second laterally-curved displays includes a first lateral section distal from the medial plane and having a curvature with a first radius and a second lateral section adjacent to the medial plane and having a curvature with a second radius less than the first radius, and wherein the first and second laterally-curved displays comprise foveated displays.

2. The HMD device of claim 1, further comprising:
first and second lenses disposed about the medial plane, the first lens offset from a display face of the first laterally-curved display and the second lens offset from a display face of the second laterally-curved display.

3. The HMD device of claim 2, wherein:
the first lens comprises a lens with a lateral curvature concentric about an anticipated position of a left eye of a user; and
the second lens comprises a lens with a lateral curvature concentric about an anticipated position of a right eye of a user.

4. The HMD device of claim 2, wherein:
the first lens comprises a lens with a laterally-varying curvature; and
the second lens comprises a lens with a laterally-varying curvature.

5. The HMD device of claim 1, wherein:
the first and second laterally-curved displays are operated to present stereoscopic virtual reality imagery.

6. The HMD device of claim 1, wherein:
the first and second laterally-curved displays are operated to present stereoscopic augmented reality imagery.

7. A head mounted display (HMD) device comprising:
first and second laterally-curved displays disposed about a medial plane, wherein each of the first and second laterally-curved displays includes a first lateral section distal from the medial plane and having a curvature with a first radius and a second lateral section adjacent to the medial plane and having a curvature with a second radius less than the first radius;

first and second lenses disposed about the medial plane, the first lens offset from a display face of the first display and the second lens offset from a display face of the second display;

wherein the first lens comprises a lens with a laterally-varying curvature concentric about an anticipated position of a left eye of a user and has a laterally-varying refractive index based on the laterally-varying curvature of the first lens; and wherein the second lens comprises a lens with a laterally-varying curvature and has a laterally-varying refractive index based on the laterally-varying curvature of the second lens.

8. A head mounted display (HMD) device comprising:
a first display for displaying imagery to a left eye of a user;
a second display for displaying imagery to a right eye of a user;
a bridge structure disposed between a right-side edge of the first display and a left-side edge of the second display;
a first laterally-curved lens offset from a display face of the first display;
a second laterally-curved lens offset from a display face of the second display;
wherein the first display has a lateral curvature that decreases in radius toward the right-side edge;
wherein the second display has a lateral curvature that decreases in radius toward the left-side edge;
wherein the first lens has a laterally-varying curvature and a laterally-varying refractive index; and
wherein the second lens has a laterally-varying curvature and a laterally-varying refractive index.

9. A head mounted display (HMD) device comprising:
a first display for displaying imagery to a left eye of a user;
a second display for displaying imagery to a right eye of a user;
a bridge structure disposed between a right-side edge of the first display and a left-side edge of the second display;
wherein the first display has a lateral curvature that decreases in radius toward the right-side edge;
wherein the second display has a lateral curvature that decreases in radius toward the left-side edge; and
wherein the first and second displays comprise foveated displays.

10. The HMD device of claim 9, wherein:
the first and second displays are operated to present stereoscopic imagery.

11. A head mounted display (HMD) device comprising:
first and second laterally-curved displays disposed about a medial plane; and
first and second laterally-curved lenses disposed about the medial plane, the first laterally-curved lens offset from a display face of the first laterally-curved display and having a laterally-varying refractive index, and the second laterally-curved lens offset from a display face of the second laterally-curved display and having a laterally-varying refractive index.

12. The HMD device of claim 11, wherein:
the first laterally-curved lens has a laterally-varying curvature; and
the second laterally-curved lens has a laterally-varying curvature.

13. The HMD device of claim 11, wherein:
the first and second laterally-curved lenses have refractive indexes that vary continuously.

14. The HMD device of claim 11, wherein:
the first and second laterally-curved lenses have refractive indexes that vary discretely.

15. The HMD device of claim 11, wherein:
the first and second laterally-curved displays comprise foveated displays.

16. The HMD device of claim 11, wherein:
the first and second laterally-curved displays are operated to present stereoscopic virtual reality imagery.

17. The HMD device of claim 11, wherein:
the first and second laterally-curved displays are operated to present stereoscopic augmented reality imagery.

* * * * *